United States Patent
Sharpe

[19]

[11] Patent Number: 5,810,437
[45] Date of Patent: Sep. 22, 1998

[54] PORTABLE, COLLAPSIBLE CHILD SAFETY SEAT FOR USE IN A SHOPPING CART

[76] Inventor: Teresa R. Sharpe, 5 Helen Dr., Madisonville, La. 70447

[21] Appl. No.: 871,224

[22] Filed: Jun. 9, 1997

[51] Int. Cl.⁶ ........................................................ A47D 1/10
[52] U.S. Cl. .................. 297/256.17; 297/255; 297/447.3
[58] Field of Search .......................... 297/45, 243, 250.1, 297/254–256, 256.17, 447.2, 447.3

[56] References Cited

U.S. PATENT DOCUMENTS

| | | |
|---|---|---|
| D. 281,365 | 11/1985 | Gugler . |
| D. 336,993 | 7/1993 | Gray . |
| D. 342,835 | 1/1994 | Mink . |
| 1,192,798 | 7/1916 | Scott ........................................ 297/255 |
| 2,365,003 | 12/1944 | Reinholz ........................... 297/447.2 X |
| 2,399,792 | 5/1946 | Copp .................................... 297/255 X |
| 2,494,813 | 1/1950 | Hughes ..................................... 297/487 |
| 2,508,822 | 5/1950 | Goldberg ................................ 297/255 |
| 3,146,026 | 8/1964 | Berlin .................................. 297/487 X |
| 4,108,489 | 8/1978 | Salzman . |
| 4,204,695 | 5/1980 | Salzman . |
| 4,324,430 | 4/1982 | Dimas, Jr. et al. . |
| 4,637,622 | 1/1987 | Burgard . |
| 4,651,366 | 3/1987 | Lande et al. . |
| 4,958,887 | 9/1990 | Meeker . |
| 4,971,343 | 11/1990 | Wood . |
| 5,277,473 | 1/1994 | Kelly et al. . |

*Primary Examiner*—Peter R. Brown
*Attorney, Agent, or Firm*—Lisa D. Charouel

[57] ABSTRACT

A portable, collapsible child safety seat for use within a shopping cart. The portable, collapsible child safety seat comprises a seat support frame member securable to an interior rear wall of the shopping cart wherein the seat support frame comprises a first L-shaped member and a second L-shaped member. The portable, collapsible child safety seat further comprises a collapsible seating member for suspending a child within the shopping cart, having a first longitudinal side coupled to the first L-shaped support frame member and a second longitudinal side coupled to the second L-shaped member and a rotatable horizontal support bar coupled to the seat support frame member wherein the horizontal support bar serves to maintain the seat support frame in a full extended position. Henceforth, existing shopping carts, having coupled thereto the portable, collapsible child safety seat of the present invention, are capable of accommodating two children. One child can be accommodated in the foldable compartment of the shopping cart and the other child can be accommodated in the portable, collapsible child safety seat of the present invention.

20 Claims, 6 Drawing Sheets

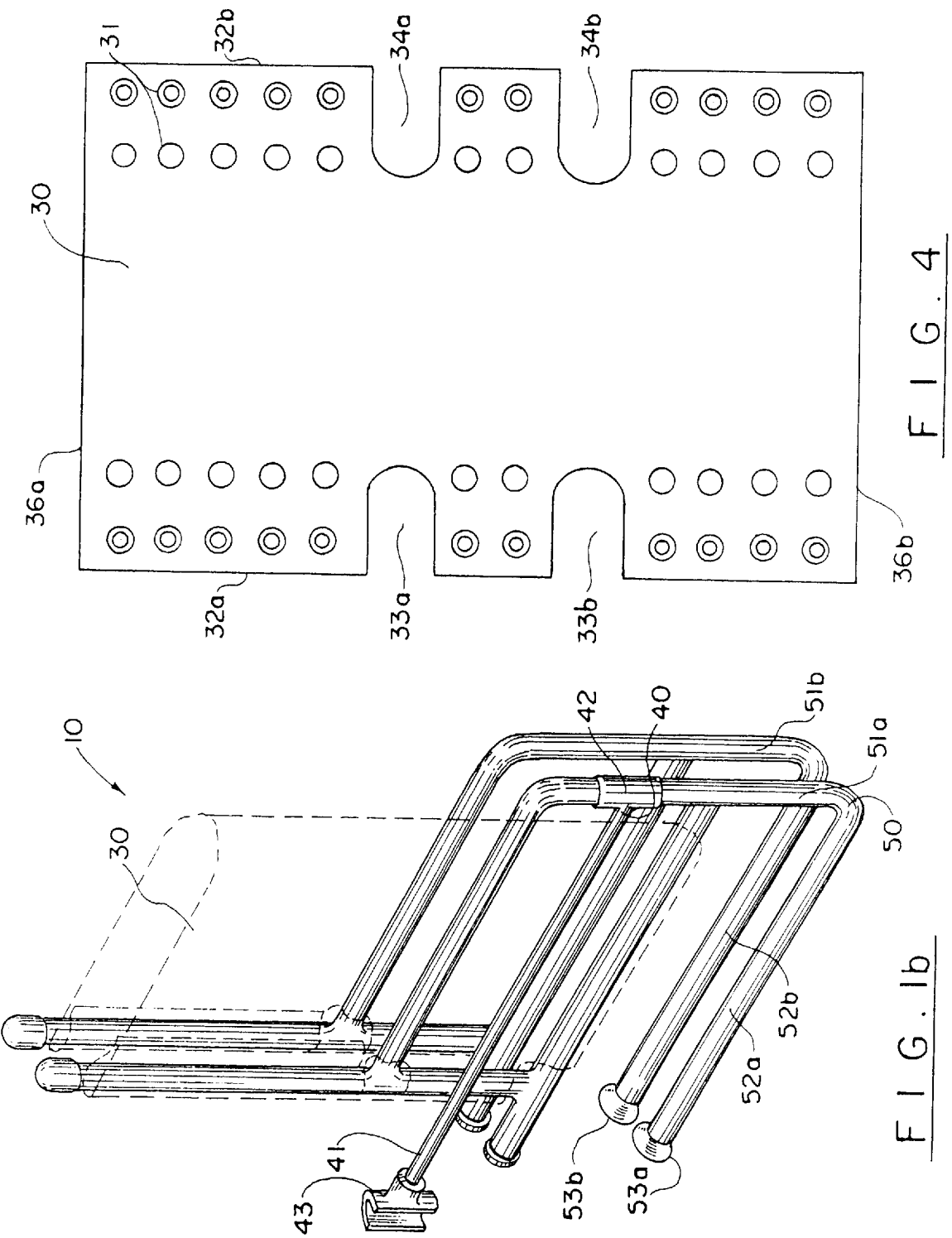

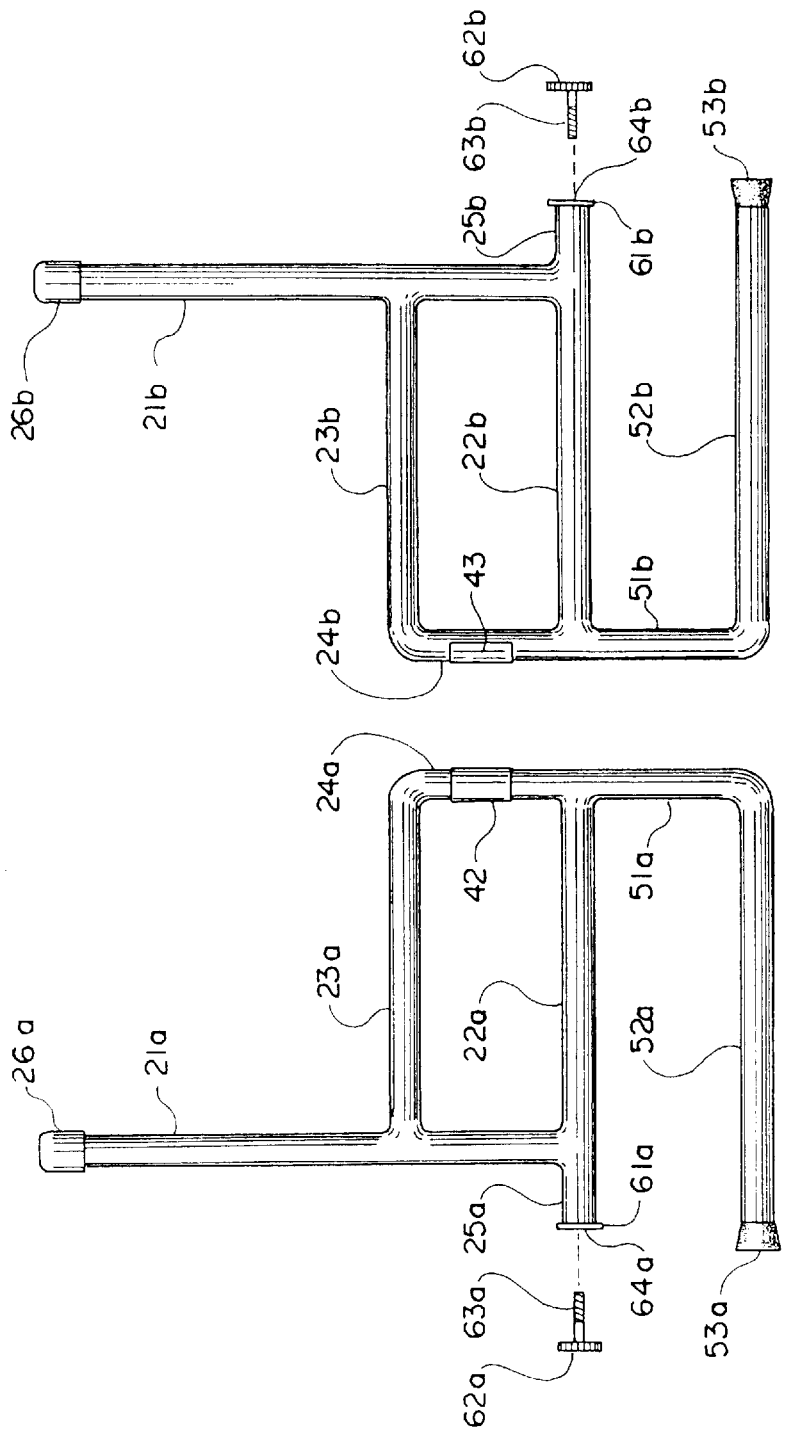

PORTABLE, COLLAPSIBLE CHILD SAFETY SEAT FOR USE IN A SHOPPING CART

TECHNICAL FIELD

The present invention relates to child seats for use in shopping carts and, more particularly, to a portable, collapsible child safety seat which safely suspends a baby or child/toddler within the main basket compartment area of a shopping cart such that the ease of maneuverability and propulsion of the shopping cart are not compromised; the storage capacity of the main basket compartment area is not significantly diminished; and, the baby or child/toddler is not cramped or crowded by the buildup of goods within such main basket compartment area. Furthermore, the portable, collapsible child safety seat provides a comfortable and secure seat for a baby or child/toddler when the foldable compartment, useable as a child seat, of the shopping cart is occupied with another baby or child/toddler. Additionally, the portable, collapsible child safety seat is lightweight and collapsible thereby rendering the portable, collapsible child safety seat easily toteable from store-to-store.

BACKGROUND OF THE INVENTION

As is known, most shopping carts are equipped with a foldable compartment wherein such foldable compartment may be used as a child's seat or an extra isolated compartment for placing goods therein such as, without limitation, fragile goods. Therefore, shopping carts of retail establishments and grocery stores (hereinafter referred to as stores) are designed to accommodate shoppers with children or without using a single shopping cart. Such foldable compartments may have a strapping member coupled thereto for allowing a shopper to secure a child/toddler in such foldable compartment. These known strapping members, usually, only strap the midriff area of the child/toddler.

Several devices have been patented which are aimed at a child seat for use in such foldable compartment, such as described in U.S. Pat. Nos. 4,108,489 and 4,204,695, by Salzman; U.S. Pat. No. 4,651,366, by Lande et al.; and, U.S. Design Patent No. Des. 342,835, by Mink. As can be appreciated, the foldable compartment only accommodates therein a single seat for a single baby or child/toddler.

Some stores offer special shopping carts which are equipped with a special infant carrier for securing an infant therein while the mother or other adult in care of such infant shops, such as described in U.S. Pat. No. 4,971,343, by Wood; U.S. Pat. No. 4,958,887, by Meeker; and, U.S. Pat. No. 5,277,473, by Kelly et al. In some instances, the securing arrangement for securing the special infant carrier to the shopping cart prevents the use of the foldable compartment for use by another child/toddler.

While each of the above infant carriers and foldable compartment seats function as desired, none of them provides an extra comfortable seat in the main basket compartment area of a shopping cart. Therefore, for a mother with at least two babies or at least two child/toddlers (both of which are hereinafter sometimes referred to as children) must place one of such babies or child/toddlers within the main basket compartment area of the shopping cart to prevent a child/toddler from running in the isles and playing with the items on the shelf.

Usually, mothers who shop, which have an infant and a child/toddler or at least two child/toddlers, have a problem shopping because of the absence of two seating arrangements for their children. On occasion, a mother places one child in the foldable compartment and the other child, usually a toddler, in the main basket compartment area of the shopping cart wherein such other child either sits uncomfortably on the cold, metal cage-like surface or stands on such cage-like surface. U.S. Pat. No. 4,637,622, by Burgard, teaches a strapping member for securing a child/toddler in the main basket compartment area of the shopping cart. However, the child must sit and becomes surrounded and crowded by the goods to be purchased. The child in the main basket compartment area while sitting therein becomes cramped and crowded by the surrounding goods to be purchased and often plays with or opens such goods which are highly undesirable. Moreover, the child sitting in the main basket compartment area takes up a significant amount of space therein thereby diminishing the storage capacity of the main basket compartment area. As a result, the shopper may not be able to purchase all the goods desired at the store.

On the other hand, if the child stands in the main basket compartment area (which is sometimes the case), the child's legs become crowded and goods are often stepped on and crushed. Moreover, the standing child is susceptible to falling within the main basket compartment area as the shopping cart is repeatedly propelled back and forth or stopped thereby causing injury to the child. In some instances, children who have fallen, while sitting or standing within the main basket compartment area of the shopping cart, have required medical attention.

The problem with seating arrangements for accommodating two child/toddlers in the shopping carts has become a significant issue with mothers since more and more mothers are having twins or multiple births, in part, because of the use of fertility drugs. One such attempt to provide two seats is described in U.S. Des. Pat. No. Des. 336,993, by Gray. The invention, by Gray, is directed to a multiple seating arrangement for the foldable compartment of the shopping cart wherein the foldable compartment accommodates two child/toddlers. However, such multiple seating arrangement taught, by Gray, is not readily available in shopping carts at local retail establishments or grocery stores. Moreover, such multiple seating arrangement increases the width of the shopping cart making the shopping cart harder to maneuver within the isles of the stores. Nevertheless, the multiple seating arrangement, by Gray, crowds the children therein. Another attempt to provide an additional seat is shown in U.S. Des. Pat. No. Des. 281,365, by Gugler. The invention, by Gugler, is directed to a child seat capable of being attached exteriorly to the main basket compartment area of the shopping cart wherein the child seat is provided with its own wheels. Therefore, as the shopping cart is propelled, the child seat is rolled therealong. This seating arrangement adds significant weight to the shopping cart which hinders the maneuverability and propulsion of the shopping cart as the shopping cart is pushed by the shopper.

It can be readily seen that there exists the continuing need for a portable, collapsible child safety seat which safely suspends a baby or child/toddler within the main basket compartment area of a shopping cart such that the ease of maneuverability and propulsion of the shopping cart are not compromised; the storage capacity of the main basket compartment area is not significantly diminished; and, the baby or child/toddler is not cramped or crowded by the buildup of goods within such main basket compartment area. Furthermore, there exists a continuing need for a portable, collapsible child safety seat which provides a comfortable and secure seat for a baby or child/toddler when the foldable compartment, useable as a child seat, of the shopping cart is occupied with another baby or child/toddler. Additionally, there exists a continuing need for a portable, collapsible child safety seat which is lightweight and collapsible thereby rendering the portable, collapsible child safety seat easily toteable from store-to-store.

SUMMARY OF THE INVENTION

The preferred embodiment of the portable, collapsible child safety seat of the present invention solves the aforementioned problems in a straight forward and simple manner. What is provided is a portable, collapsible child safety seat which safely suspends a baby or child/toddler within the main basket compartment area of a shopping cart such that the ease of maneuverability and propulsion of the shopping cart are not compromised; the storage capacity of the main basket compartment area is not significantly diminished; and, the baby or child/toddler is not cramped or crowded by the buildup of goods within such main basket compartment area. Furthermore, the portable, collapsible child safety seat provides a comfortable and secure seat for a baby or child/toddler when the foldable compartment, useable as a child seat, of the shopping cart is occupied with another baby or child/toddler. Additionally, the portable, collapsible child safety seat is lightweight and collapsible thereby rendering the portable, collapsible child safety seat easily toteable from store-to-store.

The portable, collapsible child safety seat for use within a shopping cart of the present invention comprises a seat support frame member securable to an interior rear wall of the shopping cart wherein the seat support frame comprises a first L-shaped member and a second L-shaped member. The portable, collapsible child safety seat further comprises a collapsible seating member for suspending a child within the shopping cart, having a first longitudinal side coupled to the first L-shaped support frame member and a second longitudinal side coupled to the second L-shaped member and a rotatable horizontal support bar coupled to the seat support frame member wherein the horizontal support bar serves to maintain the seat support frame in a full extended position, when the rotatable horizontal support bar is in a first position. When horizontal support bar is in a second position, seat support frame can be collapsed.

From the forgoing, existing shopping carts, having coupled thereto the portable, collapsible child safety seat of the present invention, are capable of accommodating two children. One child can be accommodated in the foldable compartment of the shopping cart and the other child can be accommodated in the portable, collapsible child safety seat of the present invention.

In view of the above, an object of the present invention is to provide a portable, collapsible child safety seat which suspends a child within the main basket compartment area of a shopping cart safely and securely.

Another object of the present invention is to provide a portable, collapsible child safety seat which prevents the child/toddler from being surrounded and crowded by goods to be purchased.

A further object of the present invention is to provide a portable, collapsible child safety seat which can be easily secured to a myriad of readily available shopping carts found in stores.

It is a still further object of the invention to provide a portable, collapsible child safety seat which allows the main basket compartment area to be fully utilized for carrying the goods to be purchased by the shopper.

It is a still further object of the invention to provide a portable, collapsible child safety seat which is a comfortable seat for a child/toddler.

It is a still further object of the present invention to provide a portable, collapsible child safety seat which has securing straps for securing a child/toddler therein.

It is a still further object of the present invention to provide a portable, collapsible child safety seat which is lightweight and collapsible for easy toting thereof and easy storage in a vehicle.

In view of the above objects, it is a feature of the present invention to provide a portable, collapsible child safety seat which is easy to use.

Another feature of the present invention to provide a portable, collapsible child safety seat which is simple and inexpensive to manufacture.

The above and other objects and features of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1b illustrates a front perspective view of the preferred embodiment of the portable, collapsible child safety seat of the present invention shown in the fully collapsed position and wherein the collapsible seating means is shown in as the broken line;

FIG. 2 illustrates a left side view of the portable, collapsible child safety seat of the embodiment of FIG. 1a;

FIG. 3 illustrates a right side view of the portable, collapsible child safety seat of the embodiment of FIG. 1a;

FIG. 4 illustrates a view of the collapsible seating means, fully open, showing the fastening means of the portable, collapsible child safety seat of the embodiment of FIG. 1a;

DESCRIPTION OF THE EXEMPLARY EMBODIMENT

Figure 1A:
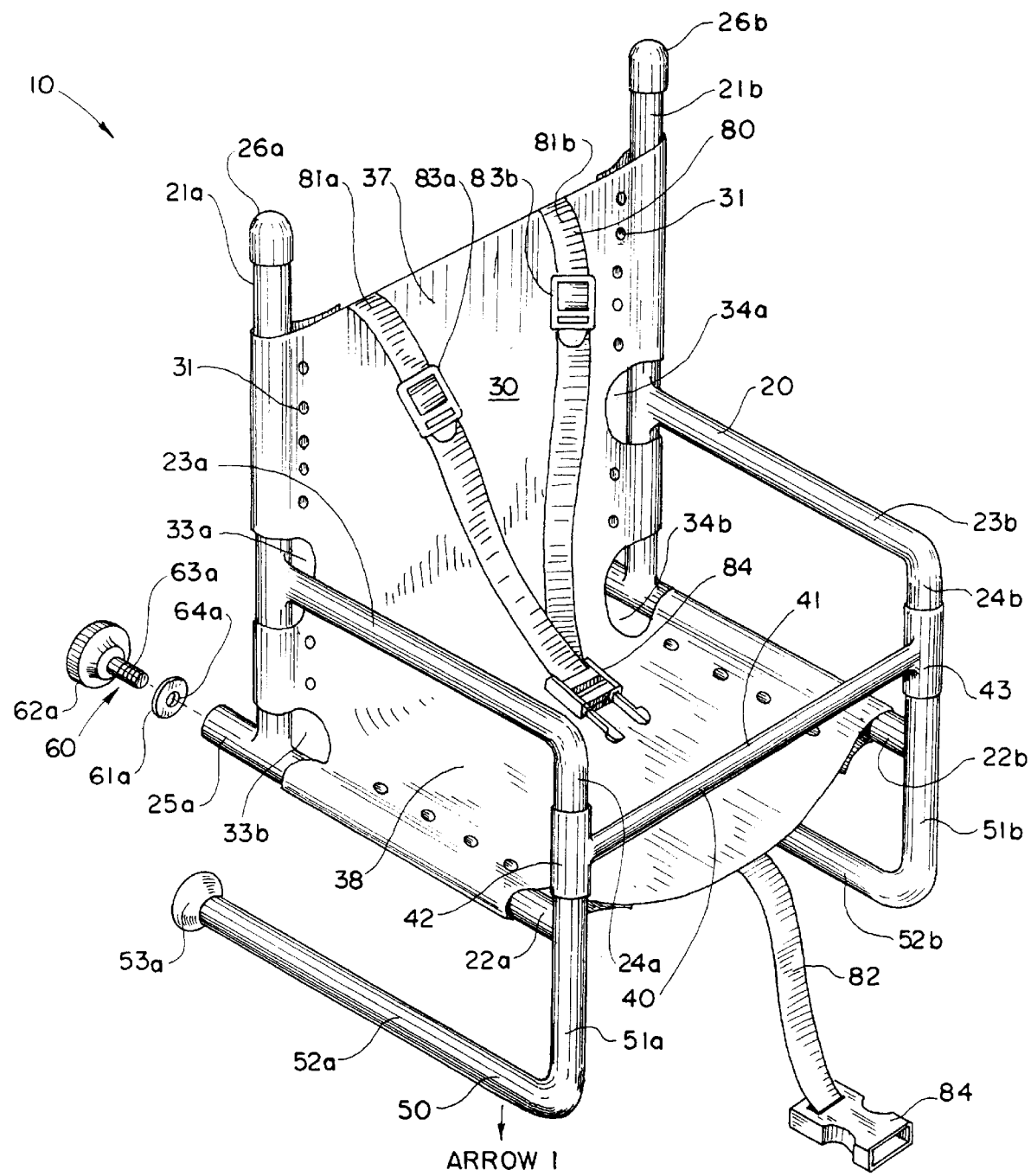
FIG. 1a illustrates a front perspective view of the preferred embodiment of the portable, collapsible child safety seat of the present invention shown in the full extended position and wherein the collapsible seating means is shown in outline.
Figure 8:
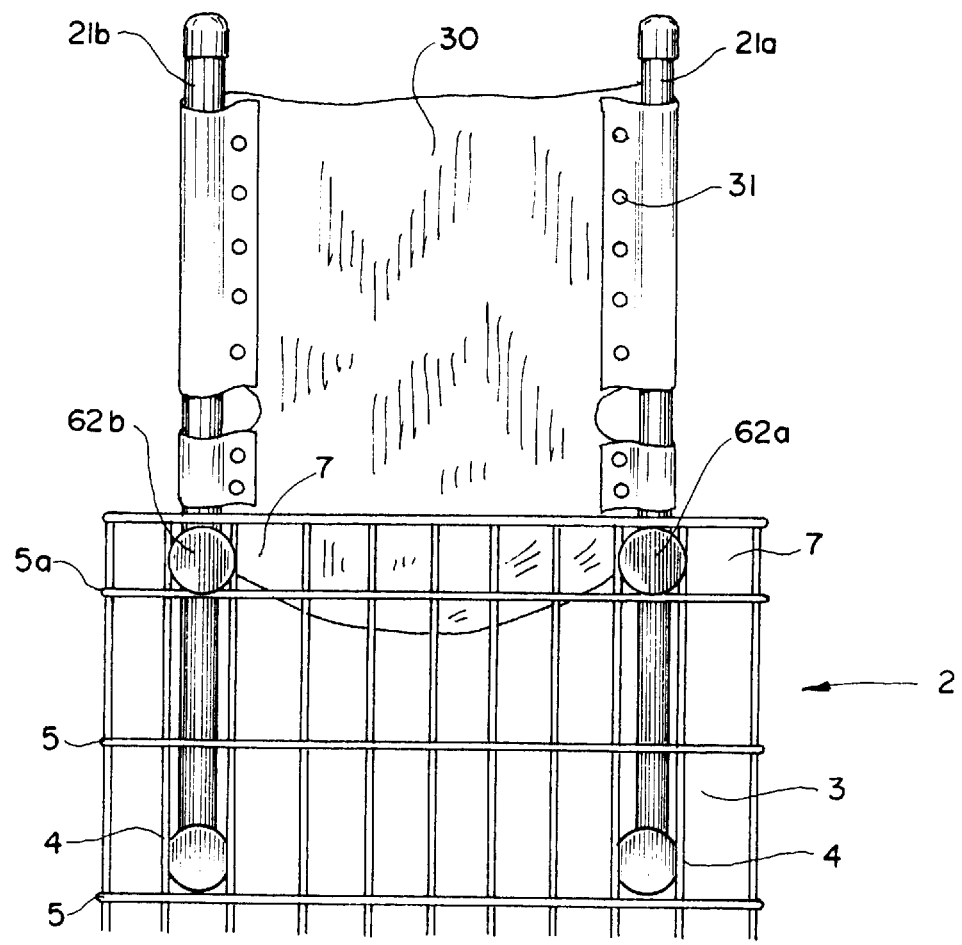
FIG. 8 illustrates a back view of the preferred embodiment of the portable, collapsible child safety seat of the present invention securely attached to a shopping cart.
Figure 9:
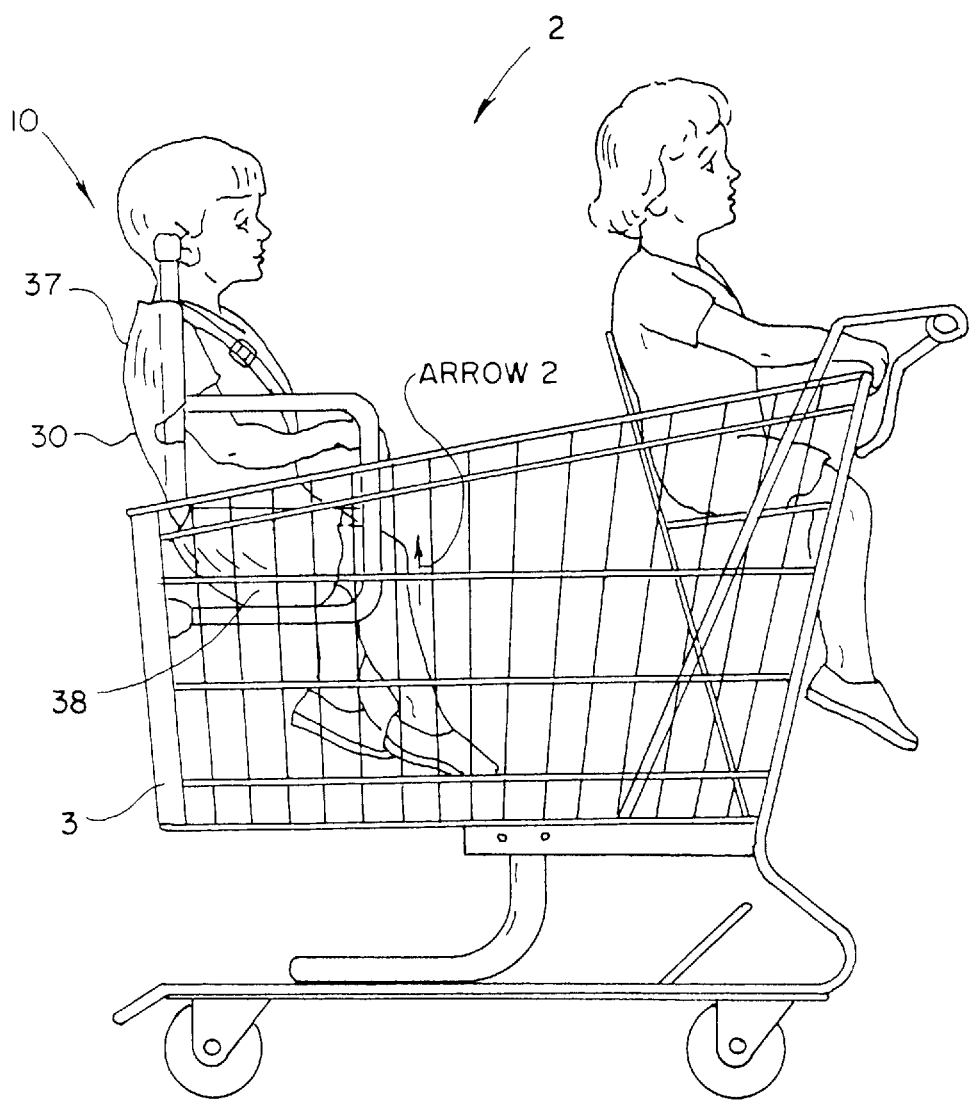
FIG. 9 illustrates a side view of the preferred embodiment of the portable, collapsible child safety seat of the present invention securely attached to a shopping cart.

Referring now to the drawings, and in particular FIG. 1a, the portable, collapsible child safety seat of the present invention is designated generally by the numeral 10. Portable, collapsible child safety seat 10 is designed to suspend a child/toddler within the main basket compartment area of shopping cart 2, as best seen in FIG. 9. Referring also to FIG. 8, cage-like rear wall 3 of shopping cart 2 is formed by a plurality of spaced vertical metal rods 4 having perpendicularly coupled thereto a plurality of spaced horizontal metal rods 5, as best seen in FIG. 8. Because of the numerous layouts used to form the main basket compartment area and, more specifically, the cage-like rear wall 3, it is prohibitive to describe each one in detail. However, I have found that the spacing between the vertical metal rods 4 is within the range of ¾" to 1". Additionally, I have found that the number of horizontal metal rods 5, other than the horizontal metal rods 5 defining the top most edge and lower most edge of the main basket compartment area, varies from shopping cart to shopping cart. In most instances, there exists a first horizontal metal rod 5a spaced a distance below the horizontal metal rod 5 defining the top most edge of the main basket compartment area. This distance ranges from ¾" to 1". The top most edge horizontal metal rod 5 and the first horizontal metal rod 5a perpendicularly coupled the plurality of spaced vertical metal rods 4 form a plurality of box-shaped apertures 7 having an area within the range of ⁹⁄₁₆ square inch to 1 square inch. Nevertheless, most all shopping carts readily available at local stores have at least one horizontal metal rod 5 other than the horizontal metal rods 5 defining the top most edge and lower most edge of the main basket compartment area wherein rectangular box-shaped apertures (not shown) are formed. Furthermore, some stores, such as K-Mart™ have shopping carts made of plastic vertical bar members and plastic horizontal bar members. The portable, collapsible child safety seat 10 is capable of being used with such shopping carts made of plastic.

Portable, collapsible child safety seat 10 is comprised of seat support frame 20, collapsible seating means 30, rotatable, horizontal support bar member 40, support legs 50 and cart securing means 60.

Referring also to FIGS. 2 and 3, seat support frame 20 comprises first and second parallel long vertical support frame members 21a and 21b, first and second parallel horizontal support frame members 22a and 22b, first and second parallel horizontal arm members 23a and 23b, first and second parallel short vertical support frame members 24a and 24b and first and second cart-to-seat spacer members 25a and 25b. One distal end of the first and second parallel long vertical support frame members 21a and 21b has perpendicularly coupled thereto first and second of parallel horizontal support frame members 22a and 22b, respectively, thereby forming a first L-shaped member and a second L-shaped member, respectively. The other distal end of the first and second parallel long vertical support frame members 21a and 21b are capped off via respective cap members 26a and 26b (such as, without limitation, a threaded cap member or a rubber stopper), respectively.

In the exemplary embodiment, first and second parallel long vertical support frame members 21a and 21b have a length of approximately 14¼ inches; first and second parallel horizontal support frame members 22a and 22b have a length of approximately 10½ inches; first and second parallel horizontal arm members 23a and 23b have a length of approximately 9¾ inches; first and second parallel short vertical support frame members 24a and 24b have length of approximately 5 inches; and, first and second cart-to-seat spacer members 25a and 25b have a length of approximately 1½ inches. Nevertheless, other dimensions may be substituted.

Each of the first and second parallel long vertical support frame members 21a and 21b further has perpendicularly coupled hereto one distal end of first and second parallel horizontal arm members 23a and 23b, respectively, wherein each respective one of first and second parallel horizontal members 23a and 23b serves the dual function of 1) an arm support for allowing a child/toddler to support their arms thereon and 2) a securing mechanism for maintaining the child/toddler within seat support frame 20. First and second parallel horizontal members 23a and 23b are spaced above and parallel to first and second of parallel horizontal support frame members 22a and 22b, respectively. The other distal end of first and second parallel horizontal arm members 23a and 23b has perpendicularly coupled thereto one distal end of first and second parallel short vertical support frame members 24a and 24b, respectively. The other distal end of first and second parallel short vertical support frame members 24a and 24b perpendicularly couples to the other distal end of first and second of parallel horizontal support frame members 23a and 23b, respectively.

First and second cart-to-seat spacer members 25a and 25b are aligned with first and second of parallel horizontal support frame members 22a and 22b, respectively, wherein first and second cart-to-seat spacer members 25a and 25b are located 180° with respect to first and second of parallel horizontal support frame members 22a and 22b, respectively. First and second cart-to-seat spacer members 25a and 25b couple to the back side of first and second parallel long vertical support frame members 21a and 21b, respectively. Henceforth, first and second cart-to-seat spacer members 25a and 25b serve to distance the child/toddler suspended in within the main basket compartment area via portable, collapsible child safety seat 10 from cage-like rear wall 3. As can be appreciated, the child/toddler's back is positioned away from cage-like rear wall 3 so that the child/toddler may be comfortable while suspended within the main basket compartment of shopping cart 2.

Figures 6, 7:
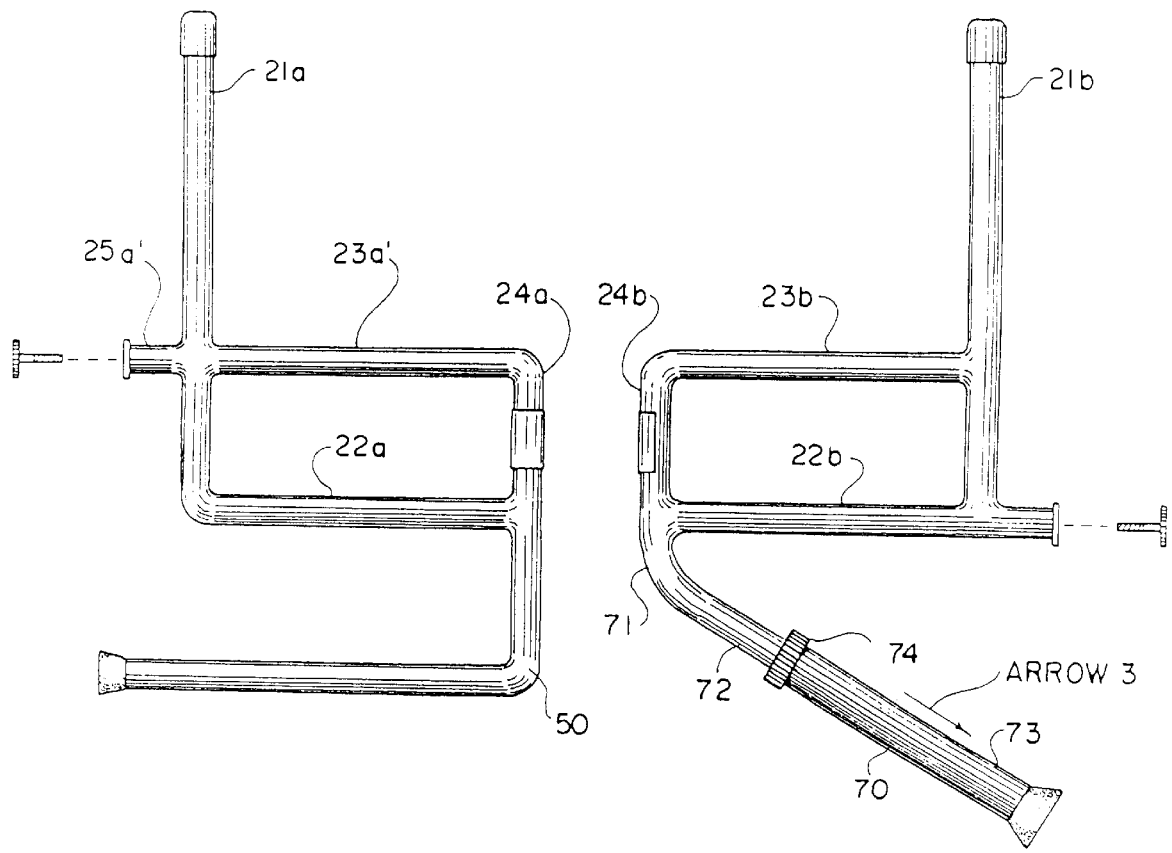
FIG. 6 illustrates an left side view of yet another alternative embodiment of the portable, collapsible child safety seat of the present invention wherein the cart-to-seat spacer member is shown in an alternate position.
FIG. 7 illustrates a right side view of yet another alternative embodiment the portable, collapsible child safety seat wherein the support leg means is modified with telescopic leg members.

As shown in FIG. 6, first and second cart-to-seat spacer members (only 25a' shown) are, alternately, aligned with first and second of parallel horizontal arm members (only 23a' shown), respectively, wherein first and second cart-to-seat spacer members (only 25a' shown) are located 180° with respect to first and second of parallel horizontal arm members (only 23a' shown), respectively.

In the preferred embodiment, first and second parallel long vertical support frame members 21a and 21b, first and second parallel horizontal support frame members 22a and 22b, first and second parallel horizontal arm members 23a and 23b, first and second parallel short vertical support frame members 24a and 24b and first and second cart-to-seat spacer members 25a and 25b are made of cylindrically shaped hollow tubular members made of a durable and sturdy plastic. The hollow properties and the use of plastic allows portable, collapsible child safety seat 10 to be lightweight such that portable, collapsible child safety seat 10 is easily toteable from store-to-store. Nevertheless, any suitable material other than plastic which allows portable, collapsible child safety seat 10 to be lightweight, easily cleaned, durable and sturdy may be substituted.

Referring also to FIG. 4, collapsible seating means 30 is a generally rectangularly-shaped piece of flexible material, such as, without limitation, canvas, nylon or the like. Collapsible seating means 30 has coupled thereto a plurality of fastening means 31 for coupling longitudinal sides 32a and 32b of collapsible seating means 30 to first and second parallel long vertical support frame members 21a and 21b, respectively, and first and second of parallel horizontal support frame members 22a and 22b, respectively. The generally rectangularly-shaped piece of flexible material comprises first and second left-side cut-away sections 33a and 33b formed in longitudinal side 32a and first and second right-side cut-away sections 34a and 34b formed in longitudinal side 32b. First left-side cut-away section 33a fits around the juncture between first parallel long vertical support frame member 21a and first parallel horizontal arm member 23a. Second left-side cut-away section 33b fits around the juncture between first parallel long vertical support frame member 21a and first parallel horizontal support frame member 22a. Likewise, first right-side cut-away section 34a fits around the juncture between second parallel long vertical support frame member 21b and second parallel horizontal arm member 23b. Second right-side cut-away section 34b fits around the juncture between second parallel long vertical support frame member 21b and second parallel horizontal support frame member 22b.

In the preferred embodiment, fastening means 31 comprises a plurality of snaps. Longitudinal side 32a of collapsible seating means 30 wraps around first parallel long vertical support frame member 21a and first parallel horizontal support frame member 22a and the plurality of snaps are snapped for securing collapsible seating means 30 to the first L-shaped member. Likewise, longitudinal side 32b of collapsible seating means 30 wraps around second parallel long vertical support frame member 21b and second parallel horizontal support frame member 22b and the plurality of snaps are snapped for securing collapsible seating means 30 to the second L-shaped member.

Fastening means 31 allows collapsible seating means 30 to be easily detached and washed, as desired, between each use of portable, collapsible child safety seat 10. Nevertheless, in lieu of fastening means 31 (snaps) collapsible seating means 30 may be fixedly attached to said first L-shaped member and said second L-shaped member whereupon the wrapped around longitudinal sides 32a and 32b may be sewn to the un-wrapped portion of collapsible seating means 30. Moreover, the plurality of snaps of fastening means 31 may be substituted with hooks or any other mechanism capable of securing collapsible seating means 30 to said first L-shaped member and said second L-shaped member. The type of material used for collapsible seating means 30 should allow such collapsible seating means 30 to be easily collapsed and should be sufficiently durable to support and suspend a child/toddler having a weight of 65 or 70 pounds.

Rotatable, horizontal support bar member 40 comprises a cylindrically shaped tubular member 41 and first and second securing bar means 42 and 43. One distal end of cylindrically shaped tubular member 41 has coupled thereto first securing bar means 42 and the other distal end has coupled thereto second securing bar means 43. First securing bar means 42 pivotally couples cylindrically shaped tubular member 41 to first parallel short vertical support frame member 24a. First securing bar means 42 rotates about the axis of first parallel short vertically support frame member 24a. Second securing bar means 43 is a clasping means for coupling to second parallel short vertical support frame member 24b. Such clasping means should be sufficiently tight to prevent a child/toddler to disconnect second securing bar means 43 from second parallel short vertical support frame member 24b. While not shown, said clasping means may be provided with a locking mechanism for locking said clasping means to second parallel short vertical support frame member 24b while portable, collapsible child safety seat 10 is in use so as to maintain portable, collapsible child safety seat 10 in the fully extended position, as best seen in FIG. 1a.

Rotatable, horizontal support bar member 40 serves the functions of 1) a support bar for maintaining portable, collapsible child safety seat 10 in a full extended position, as best seen in FIG. 1a, while rotatable, horizontal support bar member 40 is in a first position; 2) a handle bar, while rotatable, horizontal support bar member 40 is in said first position, for allowing a child/toddler to conveniently place his or her hands thereon wherein a toy may be coupled thereto of entertaining such child/toddler; and, 3) a support means, while rotatable, horizontal support bar member 40 is in said first position, for preventing the child/toddler from falling out of the portable, collapsible child safety seat 10. While, rotatable, horizontal support bar member 40 is in a second position, as best seen in FIG. 1b, rotatable, horizontal support bar member 40 releases the support for maintaining portable, collapsible child safety seat 10 in a full extended position such that portable, collapsible child safety seat 10 may be collapsed, as best seen in FIG. 1b, wherein FIG. 1b illustrates the collapsed position of portable, collapsible child safety seat 10. The collapsible properties of portable, collapsible child safety seat 10 allows portable, collapsible child safety seat 10 to be easily stored in a vehicle, as the shopper drives from store-to-store. As can be appreciated, portable, collapsible child safety seat 10 in the collapsed position does not diminish the storage capacity of the trunk or back seat of the vehicle for placing therein the newly bought goods.

Support legs 50 comprises first and second parallel leg vertical members 51a and 51b, first and second parallel horizontal leg members 52a and 52b and first and second stopper members 53a and 53b. One distal end of first parallel leg vertical member 51a perpendicularly couples to the juncture formed by the mating between first parallel horizontal support frame member 22a and first parallel short vertical support frame member 24a wherein first parallel leg vertical member 51a is positioned 180° with respect to first parallel short vertical support frame member 24a. Likewise, one distal end of second parallel leg vertical member 51b perpendicularly couples to the juncture formed by the mating between second parallel horizontal support frame member 22b and second parallel short vertical support frame member 24b wherein second parallel leg vertical member 51bis positioned 180° with respect to second parallel short vertical support frame member 24b. The other distal end of the first and second parallel leg vertical members 51a and 51b has perpendicularly coupled thereto one distal end of the first and second parallel horizontal leg members 52a and 52b, respectively. The length of first and second parallel horizontal leg members 52a and 52b extends beyond first and second parallel long vertical support frame members 21a and 21b, respectively, and extends approximately the length of first and second cart-to-seat spacer members 25a and 25b, respectively.

First and second stopper members 53a and 53b has an open end and a closed end. The open end of first and second parallel stopper members 53a and 53b couples to the other distal end of first and second parallel horizontal leg members 52a and 52b, respectively. The open end of first and second stopper members 53a and 53b should have an inner circumference capable of friction fit coupling to said other distal end of first and second parallel horizontal leg members 52a and 52b, respectively. The closed end of first and second stopper members 53a and 53b should have a circumference sufficiently larger than the spacing between vertical metal rods 4 of shopping cart 2.

Since, portable, collapsible child safety seat 10 suspends the child/toddler within the main basket compartment area, the weight of the child/toddler distributed to first and second of parallel horizontal support frame members 22a and 22b via collapsible seating means 30 causes first and second of parallel horizontal support frame members 22a and 22b to slope downward in the direction of ARROW 1, as best seen in FIG. 1a. As first and second parallel horizontal support frame members 22a and 22b slope downward under the weight of the child/toddler so does first and second parallel horizontal arm members 23a and 23b. The first and second parallel horizontal leg members 52a and 52b abut cage-like rear wall 3 of shopping cart 2, as best seen in FIG. 9. Therefore, as weight of the child/toddler applies a force downward in the direction of ARROW 1, as best seen in FIG. 1a, first and second parallel horizontal leg members 52a and 52b are urged toward the rigidly fixed cage-like rear wall 3 of shopping cart 2 thereby the force downward in the direction of ARROW 1 is counterbalanced by a reciprocating force in the direction of ARROW 2, as best seen in FIG. 9, so as to maintain first and second of parallel horizontal support frame members 22a and 22b substantially parallel to the horizontal plane. As first and second of parallel horizontal support frame members 22a and 22b are maintained substantially parallel to the horizontal plane, likewise, first and second parallel horizontal arm members 23a and 23b are maintained substantially parallel to the horizontal plane.

Figure 5:
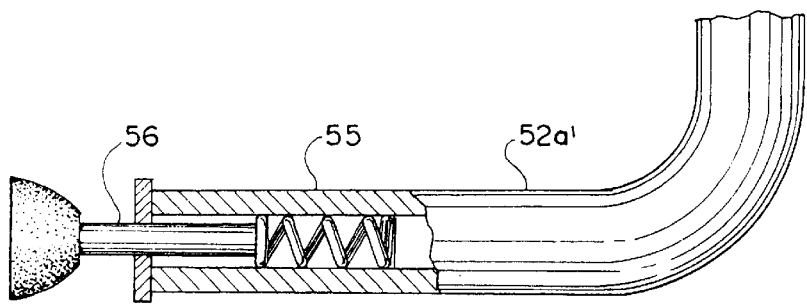
FIG. 5 illustrates a partial view of an alternate embodiment of the support leg means wherein each of the parallel horizontal leg members of support leg means is equipped with a spring biasing mechanism.

I have determined that the counterbalancing via the reciprocating force, in the direction of ARROW 2, to maintain first and second of parallel horizontal support frame members 22a and 22b substantially parallel to the horizontal plane can be optimized with spring biasing means 55, as best seen in FIG. 5. Since first and second parallel horizontal leg members 52a and 52b are identically only one such first parallel horizontal leg member 52a' will be described in detail. As shown in FIG. 5, spring biasing means 55 is coupled interiorly to first parallel horizontal leg member 52a'. Extension leg member 56 is coupled to spring biasing means 55 and is capable of sliding in and out of first parallel horizontal leg member 52a'. Extension leg member 56 in combination with spring biasing means 55 serve to urge first parallel horizontal support frame member 22a slightly upward in the opposite direction of ARROW 1. Specifically, when the weight of the child/toddler is removed from portable, collapsible child safety seat 10, extension leg member 56 is fully extended via the force exerted by spring biasing means 55. However, as the weight of the child/toddler applies a force of pressure in the direction of ARROW 1, extension leg member 56 abutting cage-like rear wall 3 is slid within first parallel horizontal leg member 52a' thereby parallelly aligning first parallel horizontal support frame member 22a to the horizontal plane and serving to provide the counterbalancing reciprocating force in the direction of ARROW 2. Likewise, second parallel horizontal support frame member 22b will be parallelly aligned to the horizontal plane with an identical extension leg member 56 in combination with spring biasing means 55.

Referring now to FIG. 7, an alternative embodiment, support legs 50 are replaced with telescopic legs 70 (only one shown). Telescopic leg 70 comprises curved coupler 71, first sloped leg member 72, second sloped leg member 73 and leg adjustor 74. One distal end of curved coupler 71 couples to the junction between second parallel short vertical support frame member 24b and second parallel horizontal support frame member 22b. The other distal end of curved coupler 71 couples to one distal end of first sloped leg member 72. The other distal end of first sloped leg member 72 couples to leg adjustor 74 and is received within the interior of second sloped leg member 73 wherein the circumference of first sloped leg member 72 is smaller than the circumference of second sloped leg member 73. Leg adjustor 74 serves to allow the second sloped leg member 73 to extend in the direction of ARROW 3.

Cart securing means 60 comprises first and second attaching washer members 61a and 61b and knob members 62a and 62b. Washer members 61a and 61b are coupled to first and second cart-to-seat spacer members 25a and 25b, respectively. Threaded ends 63a and 63b of knob members 62a and 62b are received in apertures 64a and 64b of washer members 61a and 61b, respectively.

Figure 10:
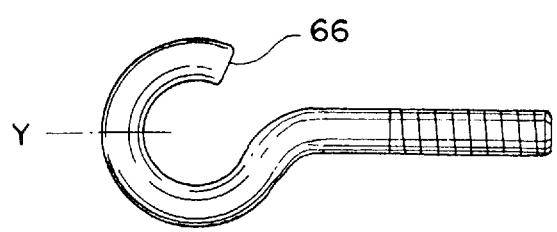
FIG. 10 illustrates a hook for use as the cart securing means of an alternative embodiment.

Cart securing means 60 secures portable, collapsible child safety seat 10 to shopping cart 2 via box-shaped apertures 7. As shown in FIG. 10, in lieu of knob members 62a and 62b described above, such knob members may be substituted with hooks 66 wherein the threaded ends of the hooks 66 will be received in washer members 61a and 61b. Nevertheless, any securing means which securely and safely attaches portable, collapsible child safety seat 10 may be substituted which permits portable, collapsible child safety seat 10 to be easily attached and detached from shopping cart 2. Hooks 66 will allow portable, collapsible child safety seat 10 to be attached to the top most edge horizontal metal rod 5. Washer members 61a and 61b and knob members 62a and 62b have a circumference with is larger than the spacing between any to immediately adjacent parallel vertical metal rods 4 thereby parallel vertical metal rods 4 are sandwiched between washer member 61a and knob member 62a and washer member 61b and knob member 62b.

Nevertheless, in lieu of washer members 61a and 61b, cart-to-seat spacer members 25a and 25b may be dimensioned with a circumference large enough to extend beyond two parallel vertical metal rods 4 to prevent the passage of cart-to-seat spacer members 25a and 25b though the spacing therebetween.

Portable, collapsible child safety seat 10 is further provided with adjustable child strapping means 80 which serves to strap the child/toddler within portable, collapsible child safety seat 10. Adjustable child strapping means 80 comprises two breast strap members 81a and 81b, center strap member 82 and a plurality of strap adjusting means 83a and 83b. One distal end of each of the two breast strap members 81a and 81b is coupled to side 36a of collapsible seating means 30. The other distal end of the two breast strap members 81a and 81b couple to strap coupling means 84. The length of breast strap members 81a and 81b are adjusted via strap adjusting means 83a and 83b, respectively. One distal end of center strap member 82 couples to side 36b of collapsible seating means 30. The other distal end of center strap member 82 couples to strap coupling means 84.

The adjustable feature of child strapping means 80 allows portable, collapsible child safety seat 10 to accommodate therein child/toddlers of different sizes and shapes. Adjustable child strapping means 80 applies a comfortable force of pressure to the child/toddler to maintain the child/toddler securely within portable, collapsible child safety seat 10.

The following description will be referring to the operation of portable, collapsible child safety seat 10 for use in a shopping cart. Portable, collapsible child safety seat 10 in the collapsed position, shown in FIG. 1b, is carried by a shopper to a store. The shopper fully extends portable, collapsible child safety seat 10. The shopper may then couple cart-to-seat spacer members 25a and 25b to the shopping cart 2 via cart securing means 60. The shopper should separate as much as possible said first and second L-shaped members such that collapsible seating means 30 becomes fully stretched apart. I have determined that a 14" spacing between first L-shaped member and second L-shaped member is capable of accommodating the different shopping carts found in stores. Collapsible seating means 30 provides back supporting seat member 37 and bottom supporting seat member 38 so as to suspend the child/toddler within the main basket compartment area. Thereafter, rotatable, horizontal support bar member 40 is rotated to said first position and said clasping means is coupled to second parallel short vertical support frame member 24b. As can be appreciated, rotatable, horizontal support bar member 40 serves the functions of 1) a support bar for maintaining portable, collapsible child safety seat 10 in a full extended position, as best seen in FIG. 1a, while rotatable, horizontal support bar member 40 is in a first position; 2) a handle bar, while rotatable, horizontal support bar member 40 is in said first position, for allowing a child/toddler to conveniently place his or her hands thereon wherein a toy may be coupled thereto of entertaining such child/toddler; and, 3) a support means, while rotatable, horizontal support bar member 40 is in said first position, for preventing the child/toddler from falling out of the portable, collapsible child safety seat 10. Additionally, support legs 50 should be placed such that first and second parallel horizontal leg members 52a and 52b abut cage-like rear wall 3 of shopping cart 2.

The child/toddler may then be placed in portable, collapsible child safety seat 10, in said full extended position, and strapped therein via adjustable child strapping means 80.

After the shopper is finished with shopping, the shopping cart 2 is preferably rolled to the shoppers vehicle. The child is unstrapped and removed from portable, collapsible child safety seat 10 while, portable, collapsible child safety seat 10 is in its fully extended position. Thereafter, rotatable, horizontal support bar member 40 is moved to its second position, as best seen in FIG. 1b, thereby rotatable, horizontal support bar member 40 releases the support for maintaining portable, collapsible child safety seat 10 in a full extended position such that portable, collapsible child safety seat 10 may be collapsed, as best seen in FIG. 1b, wherein FIG. 1b illustrates the collapsed position of portable, collapsible child safety seat 10. Thereafter, portable, collapsible child safety seat 10 is detached from shopping cart 2 via cart securing means 60 and is placed in the vehicle after portable, collapsible child safety seat 10 has been fully collapsed.

As shown in FIG. 9, space within the main basket compartment area of shopping cart 2 below the child/toddler's feet and below bottom supporting seat member 38 of collapsible seating means 30 is unobstructed for the placement of goods within the main basket compartment area of shopping cart 2.

As can be appreciated, portable, collapsible child safety seat 10 safely suspends a baby or child/toddler within the main basket compartment area of shopping cart 2 such that the ease of maneuverability and propulsion of the shopping cart 2 are not compromised; the storage capacity of the main basket compartment area is not significantly diminished; and, the baby or child/toddler is not cramped or crowded by the buildup of goods within such main basket compartment area. As can be seen, portable, collapsible child safety seat 10 provides a comfortable and secure seat for a baby or child/toddler when the foldable compartment, useable as a child seat, of the shopping cart is occupied with another baby or child/toddler.

It is noted that the embodiment of portable, collapsible child safety seat described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A child seat for use within a shopping cart comprising:
    a seat support frame adapted to be secured to a vertical cage wall of the shopping cart wherein said seat support frame comprises:
    a first L-shaped member having an upright vertical portion and a lower horizontal portion, a second L-shaped member having an upright vertical portion and a lower horizontal portion,
    a first leg support member coupled to a front end of said lower horizontal portion of said first L-shaped member wherein said first leg support member extends downwardly and rearwardly and which is adapted to abut against said vertical cage wall, and
    a second leg support member coupled to a front end of said lower horizontal portion of said second L-shaped member wherein said second leg support member extends downwardly and rearwardly and which is adapted to abut against said vertical cage wall and wherein said first leg support member and said second leg support member provide a counterbalancing reciprocating force to counterbalance weight of a child; fastening means removably coupled to said horizontal portions for securing the support frame to the vertical cage wall of the shopping cart; and
    seating means coupled to said first L-shaped member and said second L-shaped member for defining a vertical back support and a lower seat support for supporting the child within said shopping cart.

2. The child seat of claim 1, wherein said seat support frame further comprises:
    a first horizontal arm member having one end coupled to said upright vertical portion of said first L-shaped member a distance above said lower horizontal portion of said first L-shaped member;
    a first short vertical member coupled to the other end of said first horizontal arm member and said lower horizontal portion of said first L-shaped member;
    a second horizontal arm member having one end coupled to said upright vertical portion of said second L-shaped member a distance above said lower horizontal portion of said second L-shaped member;
    a second short vertical member coupled to the other end of said second horizontal arm member and said lower horizontal portion of said second L-shaped member; and
    a rotatable horizontal support bar having one end rotatably coupled to said first short vertical member and the other end removably coupled to said second short vertical member.

3. The child seat of claim 2 wherein said seating means is collapsible and wherein, when said other end of said rotatable horizontal support bar is removed from said second short vertical member, said first and second L-shaped members are capable of merging toward each other to a fully collapsed position and, when said other end said rotatable horizontal support bar is coupled to said second short vertical member, said first and second L-shaped members are in a fully extended position.

4. The child seat of claim 1, further comprising means for adjustably strapping said child coupled to said seating means for securing said child to said seating means.

5. The child seat of claim 1, wherein said first and second leg support members extend downwardly and rearwardly at an angle and include telescopic means for extending a length of said first and second leg support members.

6. The child seat of claim 1, wherein said first support leg member comprises:

a first vertical member having one end coupled to said front end of said lower horizontal portion of said first L-shaped member wherein said first vertical member extends downwardly; and a first horizontal member coupled to the other end of said first vertical member and is parallel to said lower horizontal portion of said first L-shaped member wherein said first horizontal member has a length longer than said lower horizontal portion of said first L-shaped member; and, wherein said second support leg member comprises:

a second vertical member having one end coupled to said front end of said lower horizontal portion of said second L-shaped member wherein said second vertical member extends downwardly, and a second horizontal member coupled to the other end of said second vertical member and extends rearwardly and is parallel to said lower horizontal portion of said second L-shaped member wherein said second horizontal member has a length longer than said lower horizontal portion of said second L-shaped member wherein said first and second horizontal members provide said counterbalancing reciprocating force to counter balance the force of the weight of said child to maintain said lower horizontal portions of said first and second L-shaped members substantially parallel to a horizontal plane.

7. The child seat of claim 6, wherein a rear end of said first horizontal member of said first leg support member and a rear end of said second horizontal member of said second leg support members include spring biasing means for resiliently engaging the vertical cage wall.

8. A child seat comprising:

a seat support frame adapted to be secured to a vertical wall wherein said seat support frame comprises:

a first L-shaped member having an upright vertical portion with and upper end portion and a lower horizontal portion, a second L-shaped member having an upright vertical portion with and upper end and a lower horizontal portion, a first cart-to-seat spacer member coupled below said upper end and extending rearwardly from said upright vertical portion of said first L-shaped member, a second cart-to-seat spacer member coupled below said upper end and extending rearwardly from of said upright vertical portion of said second L-shaped member, a first means for securing said first cart-to-seat spacer member to said vertical wall, a second means for securing said second cart-to-seat spacer member to said vertical wall, a first leg support member coupled to a front end of said lower horizontal portion of said first L-shaped member wherein said first leg support member extends downwardly and rearwardly and which is adapted to abut against said vertical wall, and a second leg support member coupled to a front end of said lower horizontal portion of said second L-shaped member wherein said second leg support member extends downwardly and rearwardly and which is adapted to abut against said vertical wall and wherein said first leg support member and said second leg support member provide a counterbalancing reciprocating force to counterbalance weight of a child and, seating means coupled to said first L-shaped member and said second L-shaped member for defining a vertical back support and a lower seat support for supporting the child.

9. The child seat of claim 8, wherein said seat support frame further comprises:

a first horizontal arm member having one end coupled to said upright vertical portion of said first L-shaped member a distance above said lower horizontal portion of said first L-shaped member;

a first short vertical member coupled to the other end of said first horizontal arm member and said lower horizontal portion of said first L-shaped member;

a second horizontal arm member having one end coupled to said upright vertical portion of said second L-shaped member a distance above said lower horizontal portion of said second L-shaped member;

a second short vertical member coupled to the other end of said second horizontal arm member and said lower horizontal portion of said second L-shaped member; and a rotatable horizontal support bar having one end rotatably coupled to said first short vertical member and the other end removably coupled to said second short vertical member.

10. The child seat of claim 9, wherein said seating means is collapsible and wherein, when said other end of said rotatable horizontal support bar is removed from said second short vertical member, said first and second L-shaped members are capable of merging toward each other to a fully collapsed position and, when said other end said rotatable horizontal support bar is coupled to said second short vertical member, said first and second L-shaped members are in a fully extended position.

11. The child seat of claim 8, further comprising means for adjustably strapping said child coupled to said seating means for securing said child to said seating means.

12. The child seat of claim 8, wherein said first and second leg support members extend downwardly and rearwardly at an angle and include telescopic means for extending a length of said first and second leg support members in the direction of said vertical wall.

13. The child seat of claim 8, wherein said first support leg member comprises:

a first vertical member having one end coupled to said front end of said lower horizontal portion of said first L-shaped member wherein said first vertical member extends downwardly; and a first horizontal member coupled to the other end of said first vertical member and is parallel to said lower horizontal portion of said first L-shaped member wherein said first horizontal member has a length longer than said lower horizontal portion of said first L-shaped member; and, wherein said second support leg member comprises:

a second vertical member having one end coupled to said front end of said lower horizontal portion of said second L-shaped member wherein said second vertical member extends downwardly, and a second horizontal member coupled to the other end of said second vertical member and extends rearwardly and is parallel to said lower horizontal portion of said second L-shaped member wherein said second horizontal member has a length longer than said lower horizontal portion of said second L-shaped member wherein said first and second horizontal members provide said counterbalancing reciprocating force to counter balance the force of the weight of said child to maintain said lower horizontal portions of said first and second L-shaped members substantially parallel to a horizontal plane.

14. The child seat of claim 13, wherein a rear end of said first horizontal member of said first leg support member and a rear end of said second horizontal member of said second leg support members include spring biasing means for resiliently engaging the vertical cage wall.

15. A child seat for use in a shopping cart comprising:

a seat support frame adapted to be secured to a vertical wall of the shopping cart wherein said seat support frame comprises:

a first L-shaped member having an upright vertical portion and a lower horizontal portion, a second L-shaped members having an upright vertical portion and a lower horizontal portion, a first cart-to-seat spacer member coupled rearwardly to a juncture of said upright vertical portion and said lower horizontal portion of said first L-shaped member, a second cart-to-seat spacer member coupled rearwardly to a juncture of said upright vertical portion and said lower horizontal portion of said second L-shaped member, a first means for securing said first cart-to-seat spacer member to said vertical wall, a second means for securing said second cart-to-seat spacer member to said vertical wall, a first leg support member coupled to a front end of said lower horizontal portion of said first L-shaped member wherein said first leg support member extends downwardly and rearwardly and which is adapted to abut against said vertical wall, and a second leg support member coupled to a front end of said lower horizontal portion of said second L-shaped member wherein said second leg support member extends downwardly and rearwardly and which is adapted to abut against said vertical wall and wherein said first leg support member and said second leg support member provide a counterbalancing reciprocating force to counterbalance weight of a child and, collapsible seating means coupled to said first L-shaped member and said second L-shaped member for defining a vertical back support and a lower seat support for supporting the child.

16. The child seat of claim 15, wherein said seat support frame further comprises:

a first horizontal arm member having one end coupled to said upright vertical portion of said first L-shaped member a distance above said lower horizontal portion of said first L-shaped member;

a first short vertical member coupled to the other end of said first horizontal arm member and said lower horizontal portion of said first L-shaped member;

a second horizontal arm member having one end coupled to said upright vertical portion of said second L-shaped member a distance above said lower horizontal portion of said second L-shaped member;

a second short vertical member coupled to the other end of said second horizontal arm member and said lower horizontal portion of said second L-shaped member; and a rotatable horizontal support bar having one end rotatably coupled to said first short vertical member and the other end removably coupled to said second short vertical member.

17. The child seat of claim 16, wherein, when said other end of said rotatable horizontal support bar is removed from said second short vertical member, said first and second L-shaped members are capable of merging toward each other to a fully collapsed position and, when said other end said rotatable horizontal support bar is coupled to said second short vertical member, said first and second L-shaped members are in a fully extended position.

18. The child seat of claim 15, further comprising means for adjustably strapping said child coupled to said seating means for securing said child to said seating means.

19. The child seat of claim 15, wherein said first and second leg support members extend downwardly and rearwardly at an angle and include telescopic means for extending a length of said first and second leg support members in the direction of said vertical wall.

20. The child seat of claim 15, wherein said first support leg member comprises:

a first vertical member having one end coupled to said front end of said lower horizontal portion of said first L-shaped member wherein said first vertical member extends downwardly; and a first horizontal member coupled to the other end of said first vertical member and is parallel to said lower horizontal portion of said first L-shaped member wherein said first horizontal member has a length longer than said lower horizontal portion of said first L-shaped member; and, wherein said second support leg member comprises:

a second vertical member having one end coupled to said front end of said lower horizontal portion of said second L-shaped member wherein said second vertical member extends downwardly, and a second horizontal member coupled to the other end of said second vertical member and extends rearwardly and is parallel to said lower horizontal portion of said second L-shaped member wherein said second horizontal member has a length longer than said lower horizontal portion of said second L-shaped member wherein said first and second horizontal members provide said counterbalancing reciprocating force to counter balance the force of the weight of said child to maintain said lower horizontal portions of said first and second L-shaped members substantially parallel to a horizontal plane.

* * * * *